United States Patent
Wales et al.

(10) Patent No.: US 11,668,079 B2
(45) Date of Patent: *Jun. 6, 2023

(54) MULTIPLE FUNCTION SHOWER SYSTEMS FACILITATING LOW ACTUATION FORCE MODE SWITCHING

(71) Applicant: Delta Faucet Company, Indianapolis, IN (US)

(72) Inventors: Joshua Drew Wales, Indianapolis, IN (US); David Lee, Durham, NC (US)

(73) Assignee: Delta Faucet Company, Indianapolis, IN (US)

( * ) Notice: Subject to any disclaimer, the term of this patent is extended or adjusted under 35 U.S.C. 154(b) by 541 days.

This patent is subject to a terminal disclaimer.

(21) Appl. No.: 16/751,714

(22) Filed: Jan. 24, 2020

(65) Prior Publication Data

US 2021/0230849 A1 Jul. 29, 2021

(51) Int. Cl.
*E03C 1/04* (2006.01)
*F16K 31/06* (2006.01)
(Continued)

(52) U.S. Cl.
CPC ........ *E03C 1/0405* (2013.01); *F16K 31/0641* (2013.01); *F16K 31/402* (2013.01); *E03C 1/023* (2013.01); *E03C 1/0408* (2013.01)

(58) Field of Classification Search
CPC ........ E03C 1/023; E03C 1/025; E03C 1/0405; E03C 1/0408; E03C 1/042; F16K 31/0641; F16K 31/402
See application file for complete search history.

(56) References Cited

U.S. PATENT DOCUMENTS 3,920,185 A 11/1975 Kwok
5,199,639 A 4/1993 Kobayashi et al.
(Continued)

FOREIGN PATENT DOCUMENTS

CN 1333706 A 1/2002
CN 103547377 A 1/2014
(Continued)

OTHER PUBLICATIONS

Combination Shower Head and Hand Shower, In2ition® Two-in-One Shower, Delta Faucet Company, retrieved from https://www.deltafaucet.com/design-innovation/innovations/shower/in2ition-two-in-one-shower#anchor-products on May 21, 2019.
(Continued)

*Primary Examiner* — Michael R Reid
(74) *Attorney, Agent, or Firm* — Bose McKinney & Evans LLP

(57) ABSTRACT

A shower system includes an inlet configured to receive water from a supply conduit and a plurality of spout outlets configured to discharge water from the shower system. A diverter is configured to receive water from the inlet and deliver water to the plurality of spout outlets, and the diverter is actuatable to change a water discharge mode of the plurality of spout outlets. A valve is configured to receive water from the inlet, and the valve is actuatable to a first position and a second position. A diverter actuator is configured to receive water from the valve in the second position. The diverter actuator is actuatable from an unactuated position to an actuated position upon receiving water from the valve, and the diverter actuator thereby actuates the diverter to change the water discharge mode of the plurality of spout outlets.

20 Claims, 11 Drawing Sheets

(51) Int. Cl.
    *F16K 31/40*           (2006.01)
    *E03C 1/02*            (2006.01)

(56) References Cited

U.S. PATENT DOCUMENTS

| | | |
|---|---|---|
| 5,433,384 A | 7/1995 | Chan et al. |
| 6,230,989 B1 | 5/2001 | Haverstraw et al. |
| 7,000,854 B2 | 2/2006 | Malek et al. |
| 7,665,483 B1 | 2/2010 | Sid |
| 7,900,295 B2 | 3/2011 | Lev |
| 8,490,891 B2 | 7/2013 | Chen |
| 8,632,023 B2 | 1/2014 | Miller et al. |
| 8,876,023 B2 | 11/2014 | Peel et al. |
| 9,050,612 B2 | 6/2015 | Miller et al. |
| 9,359,748 B1 | 6/2016 | Lamy et al. |
| 9,632,514 B2 | 4/2017 | Marty et al. |
| 9,707,574 B2 | 7/2017 | Soetaert et al. |
| 9,770,726 B2 | 9/2017 | Zhou et al. |
| 9,828,752 B2 | 11/2017 | Genord et al. |
| 10,245,606 B2 | 4/2019 | Chiu et al. |
| 11,505,926 B2 | 11/2022 | Lee et al. |
| 2010/0237160 A1 | 9/2010 | Miller et al. |
| 2010/0301134 A1 | 12/2010 | Anderson et al. |
| 2013/0239320 A1 | 9/2013 | Aihara et al. |
| 2014/0054391 A1 | 2/2014 | Schroeder |
| 2014/0319248 A1 | 10/2014 | Kinle |
| 2015/0090811 A1 | 4/2015 | Wu et al. |
| 2015/0238984 A1 | 8/2015 | Lee |
| 2015/0360243 A1 | 12/2015 | Soetaert et al. |
| 2016/0136659 A1 | 5/2016 | Erickson et al. |
| 2016/0184840 A1 | 6/2016 | Yu |
| 2018/0169675 A1 | 6/2018 | Yu et al. |
| 2018/0193851 A1 | 7/2018 | L'Henaff et al. |
| 2018/0195257 A1 | 7/2018 | Hu et al. |
| 2018/0318886 A1 | 11/2018 | Libbrecht et al. |
| 2019/0093324 A1 | 3/2019 | Backus |
| 2021/0230847 A1* | 7/2021 | Lee ............... E03C 1/0405 |

FOREIGN PATENT DOCUMENTS

| | | |
|---|---|---|
| CN | 104226502 | 12/2014 |
| CN | 105769002 A | 7/2016 |
| CN | 207478849 | 6/2018 |
| CN | 108603363 A | 9/2018 |
| CN | 109926213 A | 6/2019 |
| CN | 109998408 A | 7/2019 |
| CN | 110168177 A | 8/2019 |
| CN | 110198789 A | 9/2019 |
| DE | 102011017434 | 10/2012 |
| EP | 2923822 A1 | 9/2015 |

OTHER PUBLICATIONS

Spectra+ eTouch™ 4-Function Shower Head, American Standard, retrieved from https://www.americanstandard-us.com/bathroom/shower-faucets/spectra-plus-etouch-4-function-shower-head-18-gpm-32329 on May 26, 2019.

Hansgrohe Select: Water at the touch of a button, Hansgrohe USA, retrieved from https://www.hansgrohe-usa.com/bath/planning/technologies/select on May 26, 2019.

Delta Faucet Company, U.S. Appl. No. 16/751,724, Multiple Function Shower Systems Including Consolidated Mode Switching Controls, filed Jan. 24, 2020, 32 pgs.

\* cited by examiner

US 11,668,079 B2

MULTIPLE FUNCTION SHOWER SYSTEMS FACILITATING LOW ACTUATION FORCE MODE SWITCHING

BACKGROUND AND SUMMARY OF THE DISCLOSURE

The present disclosure relates generally to multiple function shower system and, more particularly, to multiple function shower systems that facilitate low actuation force mode switching.

Multiple function showerheads operate in different modes, or selectively discharge different types of water streams (for example, a circular stream, a massaging stream, a soft stream, and the like), to suit different user preferences. Such showerheads are typically reconfigured to operate in different modes, or combinations of different modes, by actuating a diverter. In some cases, the diverter is carried by the showerhead and actuated by moving one portion relative to another portion. However, relatively high forces (for example, 2.5 lbs. or more) typically need to be applied to actuate such diverters. This can be cumbersome for users and, in some cases, such forces can instead cause inadvertent repositioning of the showerhead.

Further, in some situations it can be impractical to manipulate a showerhead including a diverter, such as when the showerhead is mounted to a high ceiling. In these situations, it can be more practical to provide diverter controls that are positioned remotely from the showerhead, including providing controls as part of a repositionable handshower. However, such systems have one or more drawbacks. For example, such systems typically include relatively long conduits that couple the showerhead and the handshower, which can cause significant water pressure loss and slow water discharge rates. As another example, such systems typically require a separate conduit for each water discharge mode of the handshower.

According to an illustrative embodiment of the present disclosure, a shower system includes an inlet configured to receive water from a supply conduit and a plurality of spout outlets configured to discharge water from the shower system. A diverter is configured to receive water from the inlet and deliver water to the plurality of spout outlets, and the diverter is actuatable to change a water discharge mode of the plurality of spout outlets. A valve is configured to receive water from the inlet, and the valve is actuatable to a first position and a second position. A diverter actuator is configured to receive water from the valve in the second position. The diverter actuator is actuatable from an unactuated position to an actuated position upon receiving water from the valve, and the diverter actuator thereby actuates the diverter to change the water discharge mode of the plurality of spout outlets.

In another illustrative embodiment of the present disclosure, a shower system includes an inlet that is configured to receive water from a supply conduit. A diverter is configured to receive water from the inlet, and the diverter is actuatable to a first mode and a second mode. A plurality of spout outlets are configured to receive water from the diverter, and the plurality of spout outlets are configured to discharge water in a first water discharge mode in the first mode and discharge water in a second water discharge mode in the second mode. A valve is configured to receive water from the inlet, and the valve is actuatable to a first position and a second position. A diverter actuator is configured to receive water from the valve in the second position, and whereupon receiving water from the valve the diverter actuator actuates the diverter from the first mode to the second mode.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
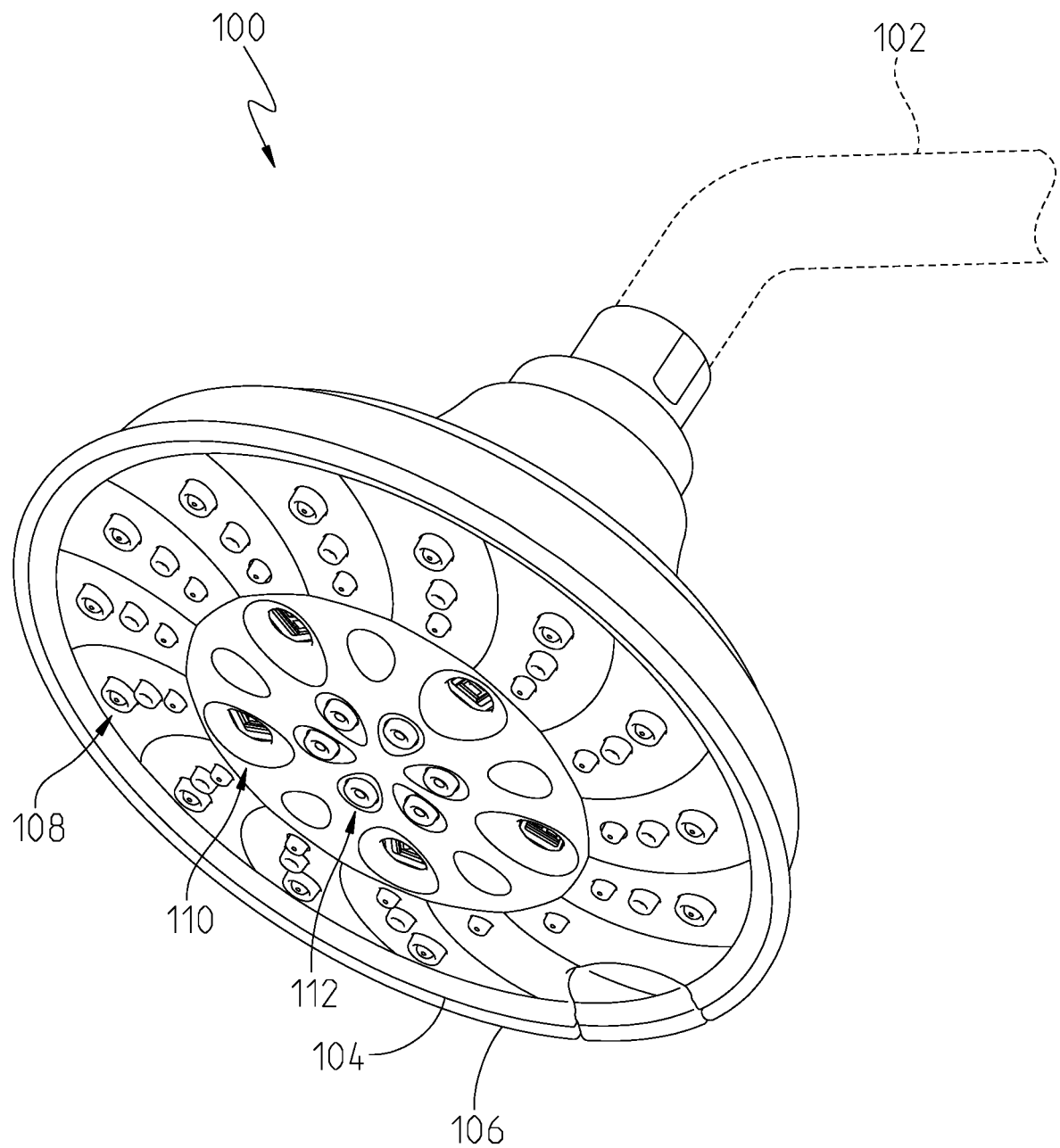
FIG. 1 is a perspective view of an illustrative multiple function shower system of the present disclosure coupled to a water supply conduit.

For the purposes of promoting and understanding the principles of the present disclosure, reference will now be made to the embodiments illustrated in the drawings, which are described herein.

With reference to FIG. 1, an illustrative multiple function, low actuation force mode switching shower system 100 of the present disclosure is shown. The shower system 100 is illustratively shown coupled to a water supply conduit 102, which may be a conventional water supply pipe disposed within a building structure (such as a ceiling or a wall—not shown) that receives and combines hot water and cold water received from a hot water source (not shown) and a cold water source (not shown), respectively. The shower system 100 is illustratively shown as a showerhead system, although in alternative embodiments the shower system 100 may be provided as a handshower system. In either case, the water supply conduit 102 delivers water to the shower system 100, and the shower system 100 illustratively discharges water at a sprayface 104 of a showerhead housing or spout 106. More specifically, the shower system 100 selectively discharges water from one or more first spout outlets 108, one or more second spout outlets 110, and one or more third spout outlets 112. In alternative embodiments, the shower system 100 may include a different number of sets of spout outlets. For example, the shower system 100 may only include one or more first spout outlets 108 and one or more second spout outlets 110, or the shower system 100 may additionally include one or more fourth spout outlets (not shown), one or more fifth spout outlets (not shown), and so on. In either case, the shower system 100 is selectively operable in different water discharge modes (that is, the shower system 100 selectively discharges water from different sets of spout outlets 108, 110, or 112) or combinations of different water discharge modes. In other embodiments, the shower system 100 may change water discharge modes by discharging water from the same outlets 108, 110, and/or 112 in different manners. For example, the outlets 108, 110, and/or 112 may discharge water at different flow rates in different water discharges modes. As a specific example, the first spout outlets 108 may discharge water at a flow rate of 0.8 gallons per minute (GPM) in a first water discharge mode and 2.5 GPM in a second water discharge mode. As another example, the outlets 108, 110, and/or 112 may discharge water using different trajectories/spray patterns in different discharge modes. As a specific example, the first spout outlets 108 may discharge water using a first outlet shape and/or a first water path in a first water discharge mode and using a second outlet shape and/or a second water path in a second water discharge mode. As described in further detail below, a relatively low actuation force may be applied by a user to the shower system 100 to change the water discharge mode.

Figure 2:
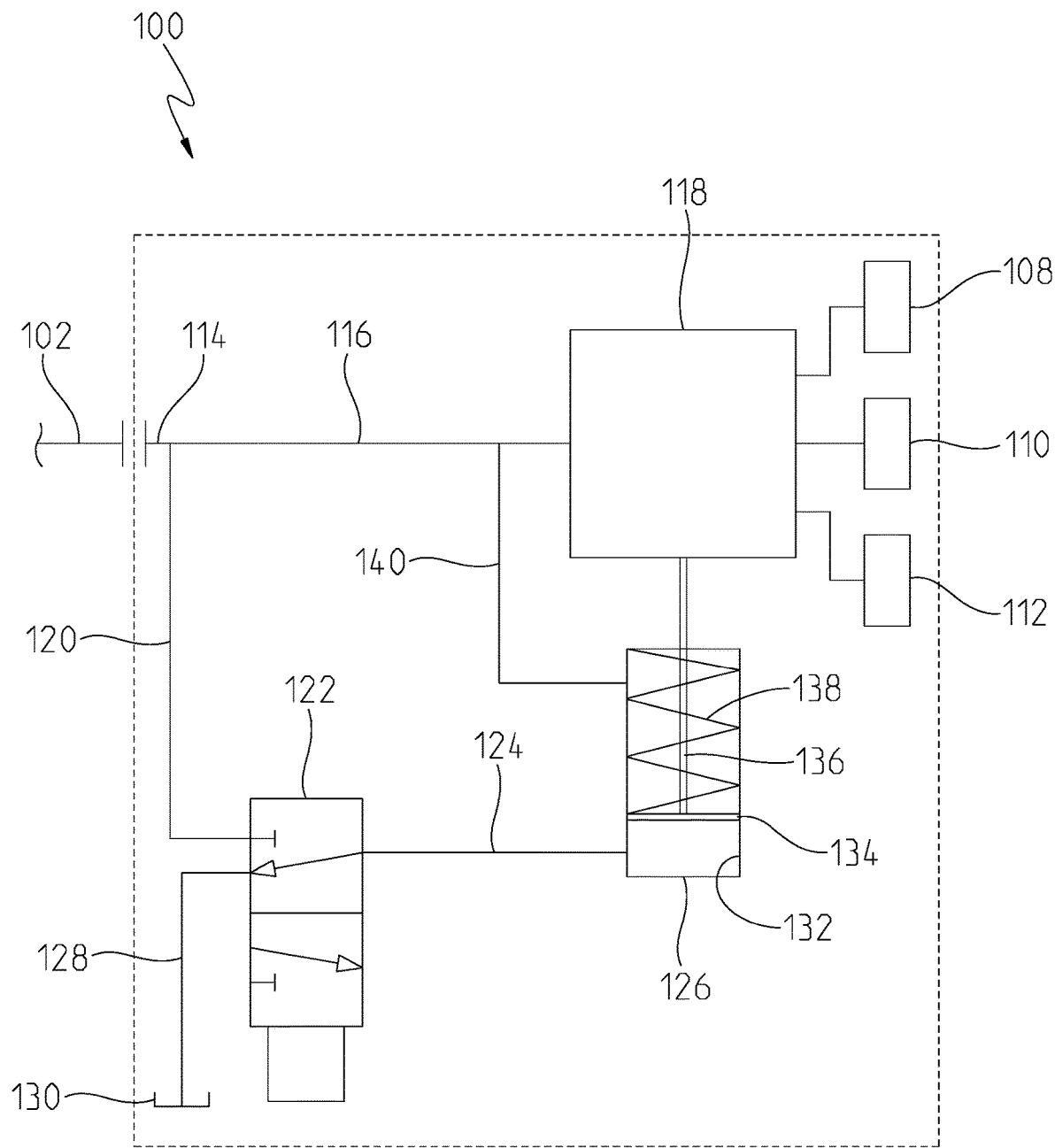
FIG. 2 is a schematic illustration of the shower system of FIG. 1 and the water supply conduit.

Referring to FIG. 2, the shower system 100 and the water supply conduit 102 are schematically illustrated. The shower system 100 illustratively includes an inlet 114 in fluid communication with the water supply conduit 102. The inlet 114 is in fluid communication with an inlet passageway 116. The inlet passageway 116 is in fluid communication with a diverter 118, and the diverter 118 is in fluid communication with and selectively delivers water to one or more of the sets of spout outlets 108, 110, and 112 for discharging the water from the shower system 100. The diverter 118 may be any mechanism that is actuatable to change the water discharge mode of the shower system 100, such as, for example, a linearly-actuated device, including a "button click" diverter 118 (more specifically, any of the diverters described in U.S. Pat. App. Pub. 2018/0195257, the disclosure of which is hereby incorporated by reference) or a "pen click" diverter 118 (having, for example, a cam and pawl mechanism), a rotatably-actuated device (having, for example, a rack and pinion mechanism), or the like.

With continued reference to FIG. 2, the shower system 100 includes additional components to facilitate low-force actuation of the diverter 118. More specifically, the shower system 100 includes a first actuator passageway 120 in fluid communication with the inlet passageway 116. The first actuator passageway 120 is also in fluid communication with a user-actuatable, low actuation force valve 122. Specific exemplary forms of the valve 122 are described below. Generally, however, the valve 122 is a two-position, three-port valve. A first position of the valve 122, as illustrated, may be the normal position of the valve 122, or the valve 122 may be biased toward the first position. In the first position, the valve 122 inhibits fluid communication between the first actuator passageway 120 and a second actuator passageway 124 in fluid communication with a hydraulically-driven diverter actuator 126. Instead, in the first position the valve 122 permits fluid communication between the second actuator passageway 124 and a discharge passageway 128. The discharge passageway 128 is in fluid communication with a discharge port 130, and the discharge port 130 thereby discharges water received from the diverter actuator 126. The discharge port 130 may be disposed inside the spout 106 (shown elsewhere), more specifically, inside the sprayface 104 (shown elsewhere), or the discharge port 130 may be in fluid communication with one of the sets of spout outlets 108, 110, and 112 to facilitate inconspicuously discharging water received from the diverter actuator 126. In a second position, the valve 122 permits fluid communication between the first actuator passageway 120 and the second actuator passageway 124. The second actuator passageway 124 delivers water to the diverter actuator 126, which causes the diverter actuator 126 to transition from an unactuated position to an actuated position, and the diverter actuator 126 thereby actuates the diverter 118 to change the water discharge mode of the shower system 100.

Still referring to FIG. 2, the diverter actuator 126 is illustratively shown as a hydraulically-driven linear actuator. More specifically, the diverter actuator 126 includes a chamber 132 for receiving water from the valve 122. The chamber 132 carries a piston 134, and the piston 134 translates within the chamber 132 when the chamber 132 receives water from the valve 122. Opposite the second actuator passageway 124, the piston 134 couples a rod 136. The rod 136 translates with the piston 134 when the chamber 132 receives water from the valve 122, and the rod 136 thereby presses and actuates the diverter 118 to change the water discharge mode of the shower system 100.

The components of the diverter actuator 126 may have any of various dimensions provided that the diverter actuator 126 is capable of providing a force sufficient to actuate the diverter 118, in view of typical pressure of the water received by the diverter actuator 126. For example, the piston 134 may have a diameter of about 0.5 inches and the diverter actuator 126 may receive water at a pressure of about 30 psi. In this case, if resistance forces are negligible, the diverter actuator 126 provides an actuator force of about 6 lbs. Such a force is sufficient to actuate various types of pen click and button click diverters.

With further reference to FIG. 2, the unactuated position may be the normal position of the diverter actuator 126, or the diverter actuator 126 may be biased toward the unactuated position. More specifically, the diverter actuator 126 may further include a spring 138, such as a compression spring, that urges the piston 134 and the rod 136 away from the diverter 118. Additionally or alternatively, the shower system 100 may further include a return passageway 140 in fluid communication with the inlet passageway 116 and the chamber 132 opposite the second actuator passageway 124. As such, water delivered by the return passageway 140 to the chamber 132 urges the piston 134 and the rod 136 away from the diverter 118. Additionally or alternatively, the diverter 118 may resist actuation and thereby urge the diverter actuator 126 toward the unactuated position.

Figure 3:
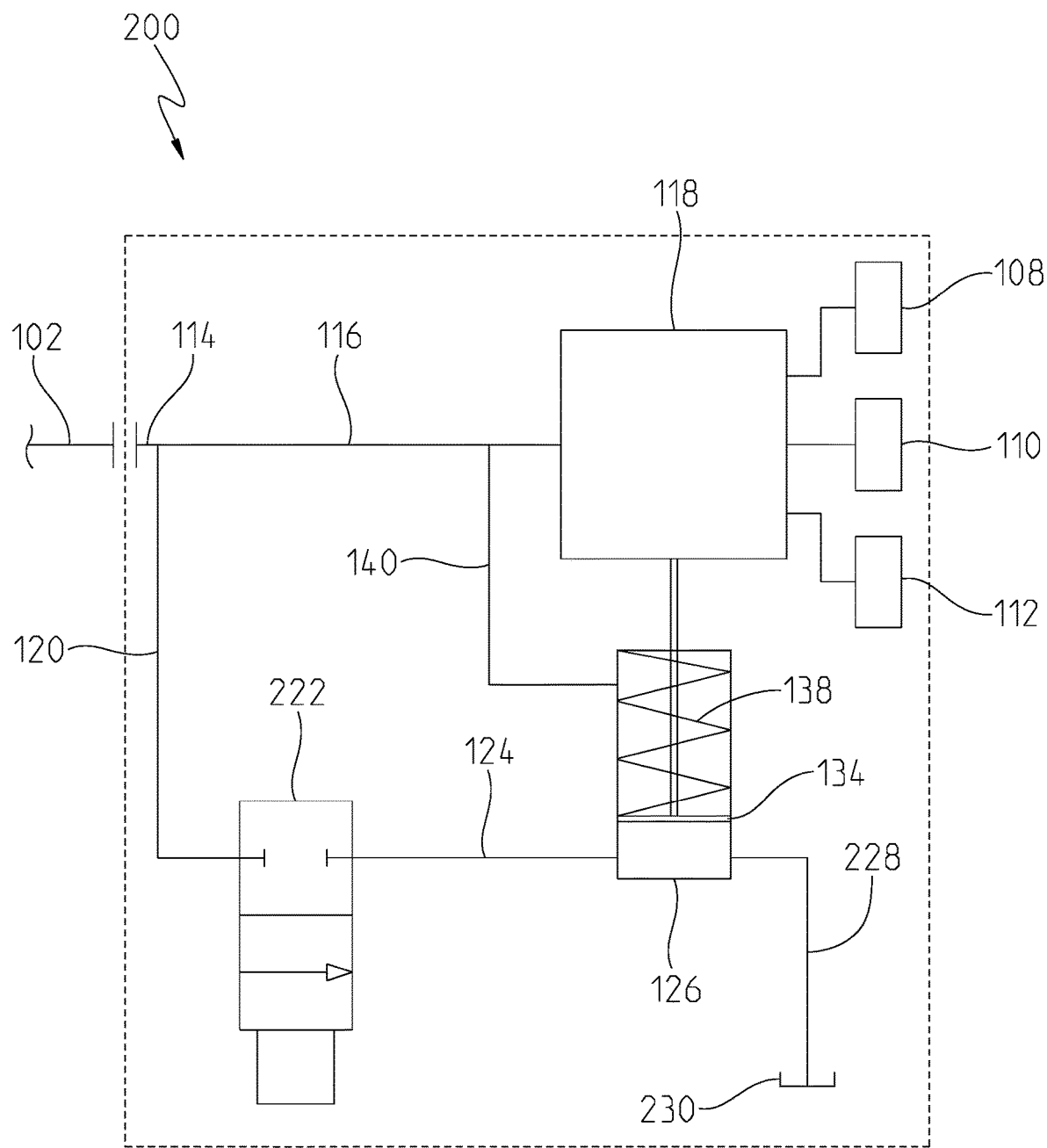
FIG. 3 is a schematic illustration of another illustrative multiple function shower system of the present disclosure coupled to a water supply conduit.

Referring now to FIG. 3, another illustrative multiple function, low actuation force mode switching shower system 200 of the present disclosure is shown coupled to the water supply conduit 102. The showerhead system 200 includes an inlet 114, an inlet passageway 116, a diverter 118, spout outlets 108, 110, and 112, a first actuator passageway 120, a second actuator passageway 124, a diverter actuator 126, and a return passageway 140, all of which are as described above. The showerhead system 200 further includes a valve 222, which may take any of the various exemplary forms described below. In contrast to the shower system 100, however, the valve 222 is generally a two-position, two-port valve, or an on/off valve. In a first position, which may be the normal position of the valve 222, the valve 222 inhibits water flow therethrough. More specifically, the valve 222 inhibits fluid communication between the first actuator passageway 120 and the second actuator passageway 124. As a result, the valve 222 does not deliver water to the diverter actuator 126. In a second position, the valve 222 permits fluid communication between the first actuator passageway 120 and the second actuator passageway 124. The second actuator passageway 124 delivers water to the diverter actuator 126, which causes the diverter actuator 126 to transition from an unactuated position to an actuated position, and the diverter actuator 126 thereby actuates the diverter 118 to change the water discharge mode of the shower system 200. The diverter actuator 126 is in fluid communication with a discharge passageway 228 in the actuated position (that is, the piston 134 normally inhibits flow to the discharge passageway 228), and the discharge passageway 228 is in fluid communication with a discharge port 230. The highest flow rate of water through the discharge port 230 occurs in the actuated position, although this flow rate is only achieved for a relatively short period of time. The valve 222 is open (that is, in the second position) for a relatively short period of time, and the diverter actuator 126 quickly fills with water and moves to the actuated position due to a significant size difference between the discharge passageway 228 and the second actuator passageway 124 (that is, the flow rate into the diverter actuator 126 greatly exceeds the flow rate out of the discharge port 230). When the valve 222 returns to the first position, the diverter actuator 126 no longer receives water from the second actuator passageway 124, and the water in the diverter actuator 126 is easily drained via the discharge passageway 228 and the discharge port 230, for example, as the spring 138 or the diverter 118 pushes the diverter actuator 126 back to the unactuated position.

Figure 4:
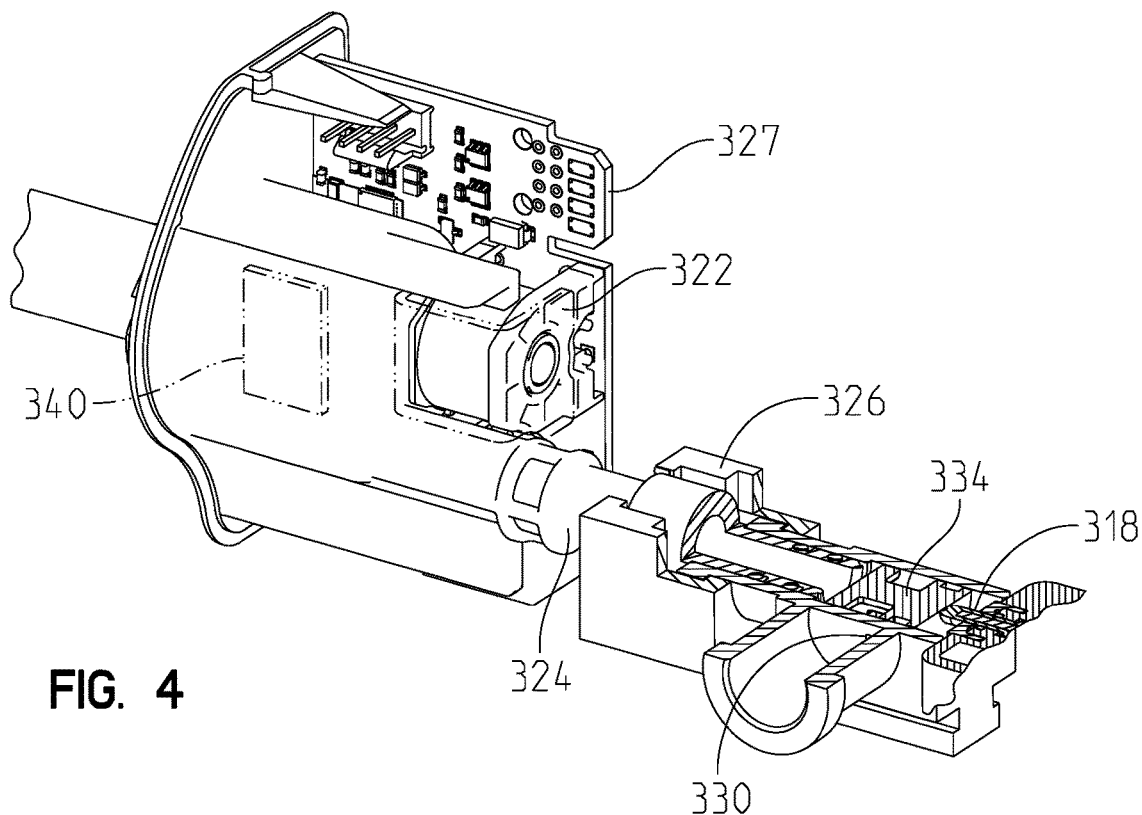
FIG. 4 is a perspective, partial section view of an illustrative valve, diverter actuator, and diverter of the present disclosure.
Figure 5:
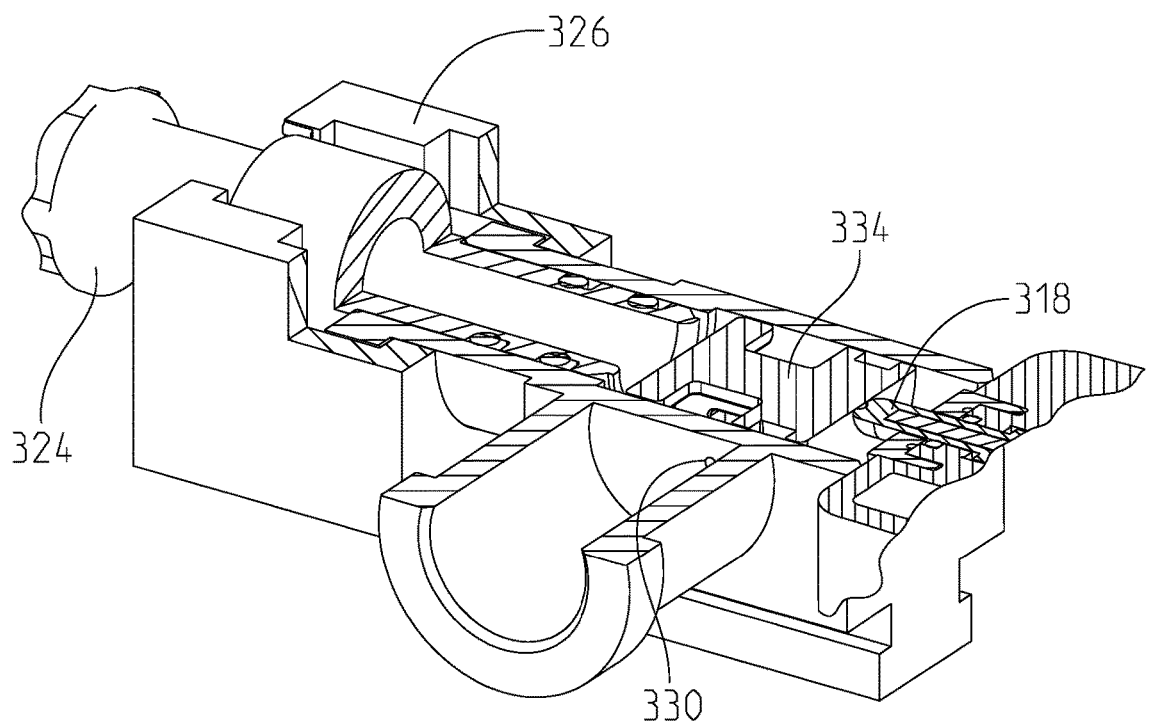
FIG. 5 is another perspective, partial section view of the valve, the diverter actuator, and the diverter of FIG. 4.

As described briefly above, the valves 122 and 222 may take various forms. Generally, for example, the valves 122 and 222 may be low actuation force electrically-actuated valves or mechanically-actuated valves. Electrically-actuated valves include, for example, pilot-operated diaphragm solenoid valves. FIGS. 4 and 5 illustrate an example of a pilot-operated diaphragm solenoid valve 322 coupled to a diverter actuator 326 and a diverter 318. The diverter actuator 326 and the diverter 318 are generally similar to the diverter actuator 126 and the diverter 118, respectively, described above. The pilot-operated diaphragm solenoid valve 322 illustratively includes a power source 340, such one or more replaceable or rechargeable batteries (including, for example, one or more wirelessly rechargeable batteries), one or more capacitors (including, for example, relatively large capacitors, including super or ultra capacitors), and/or a hydrogenerator (powered, for example, by water received from the inlet (not shown)), to facilitate energizing and actuating the valve 322. Alternatively, the valve 322 may be operably coupled to an external power source. In either case, the valve 322 receives water from a first actuator passageway (not shown). Upon actuation, the valve 322 delivers water to a second actuator passageway 324, which in turn delivers water to the diverter actuator 326 to drive the piston 334. The piston 334 thereby actuates the diverter 318 to change the water discharge mode. Thereafter, the solenoid valve 322 may be energized again to close the pilot (not shown) by moving the armature (not shown—in some embodiments, with spring assistance), thereby closing the valve 322. Water is no longer delivered to the second actuator passageway 324, and water may drain from the diverter actuator 326 via a discharge port 330. A spring (not shown) may return the piston 334 to its previous or normal position.

The pilot-operated diaphragm solenoid valve 322 may be actuated in a variety of manners. Illustratively, the pilot-operated diaphragm solenoid valve 322 includes electronics 327 for operably coupling the valve 322 to a user interface (not shown), and a user may manipulate the user interface to actuate the valve 322. In some embodiments, the user interface may be remotely positioned relative to the shower system (not shown). For example, the electronics 327 may operably couple the valve 322 to a smart device (for example, a mobile phone, a tablet computer, or the like) via wireless communication (for example, Bluetooth communication, Wi-Fi communication via the internet, or the like), and the smart device acts as the user interface and facilitates actuation of the valve 322. Such a user interface may also coordinate actuation of the valve 322 with functions of otherwise independent systems (not shown), such other shower systems, steam discharge systems, lighting systems and/or audio systems. In other embodiments, the user interface may be locally positioned relative to the shower system. For example, the electronics 327 may operably couple the valve 322 to one or more external surfaces of a shower assembly (not shown), one or more capacitive interfaces (not shown), or one or more depressible buttons (not shown) to facilitate touch-based actuation of the valve 322.

Figure 6:
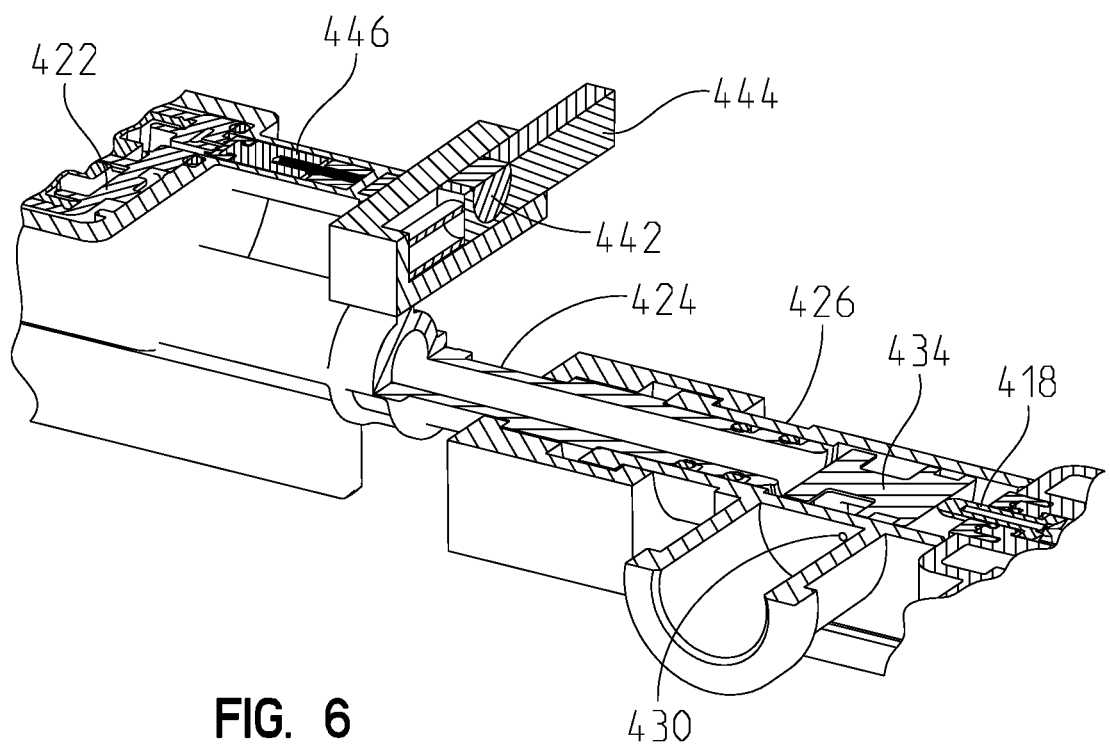
FIG. 6 is a perspective, partial section view of another illustrative valve, diverter actuator, and diverter of the present disclosure.
Figure 7:
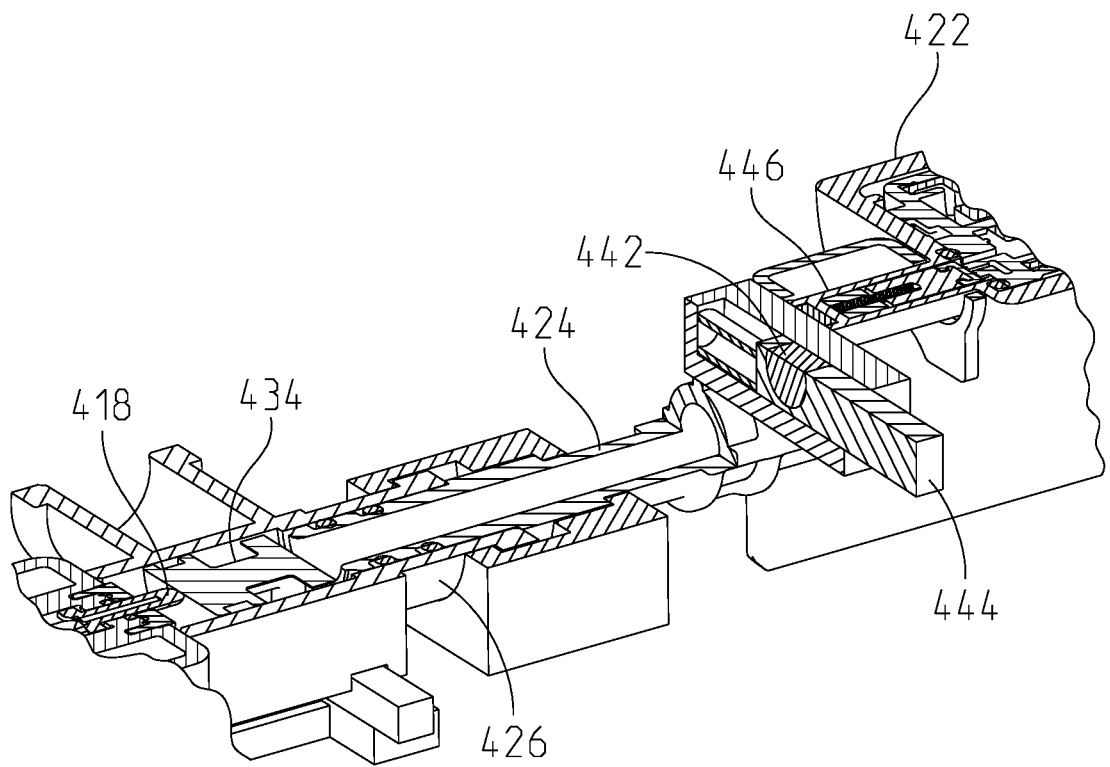
FIG. 7 is another perspective, partial section view of the valve, the diverter actuator, and the diverter of FIG. 6.

Mechanically-actuated valves include, for example, valves similar to pilot-operated diaphragm solenoid valves. FIGS. 6 and 7 illustrate an example of such a pilot-operated diaphragm valve 422 coupled to a diverter actuator 426 and a diverter 418. The diverter actuator 426 and the diverter 418 are generally similar to the diverter actuator 126 and the diverter 118, respectively, described above. The valve 422 is similar to a pilot-operated diaphragm solenoid valve, except that solenoid coils are omitted, or the solenoid coils are not energized to actuate the valve 422. Instead, the valve 422 includes a magnet 442 that is carried by a plunger 444, which may extend outwardly from a spout (not shown), couple to an external pressable button (not shown), or the like to facilitate actuation by a user. In a first position and as illustrated, the magnet 442 is disposed apart from an armature 446 of the valve 422, and the valve 422 is closed. That is, the valve 422 does not deliver water to the diverter actuator 426. Upon actuation of the plunger 444, the valve 422 transitions to a second position. In the second position, the magnet 442 is disposed proximate the armature 446 and magnetically attracts the armature 446 toward the magnet 442. This action opens the valve 422, and the valve 422 delivers water to the second actuator passageway 424, which in turn delivers water to the diverter actuator 426 to drive the piston 434. The piston 434 thereby actuates the diverter 418 to change the water discharge mode. Thereafter, the plunger 444 may be released to permit a spring (not shown) to move the plunger 444 and the magnet 442 to their previous or normal positions. This permits another spring (not shown) to move the armature 446 to its previous or normal position, which closes the pilot (not shown) and thereby closes the valve 422. Water is no longer delivered to the second actuator passageway 424, and water may drain from the diverter actuator 426 via a discharge port 430. A spring (not shown) may return the piston 434 to its previous or normal position.

Figure 8:
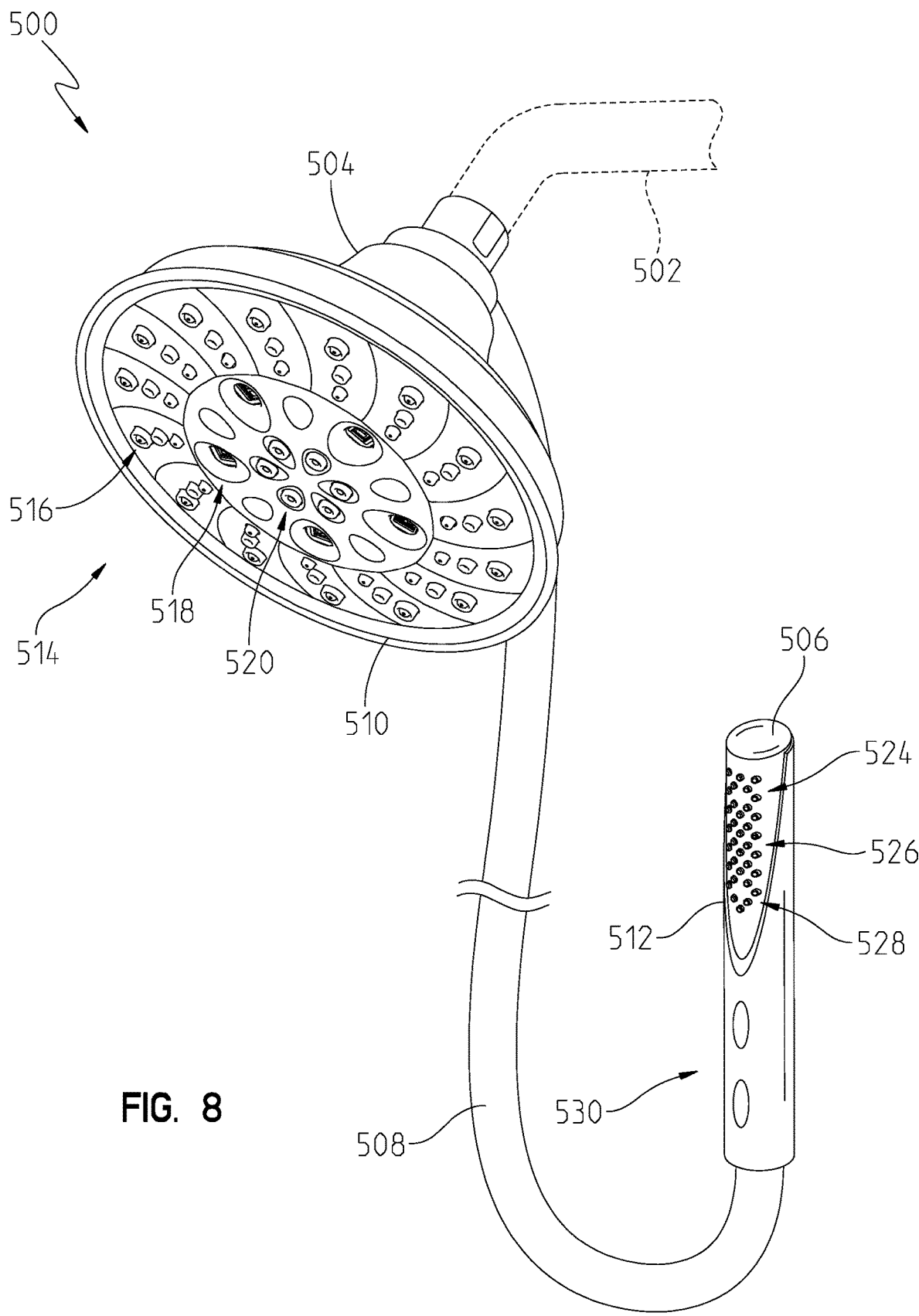
FIG. 8 is a perspective view of another illustrative multiple function shower system of the present disclosure coupled to a water supply conduit.

Referring now to FIG. 8, another illustrative multiple function shower system 500 of the present disclosure is shown. The shower system 500 is illustratively shown coupled to a water supply conduit 502, which may be a conventional water supply pipe disposed within a building structure (such as a ceiling or a wall—not shown) that receives and combines hot water and cold water received from a hot water source (not shown) and a cold water source (not shown), respectively. The shower system 500 generally includes a first spout 504 coupled to the water supply conduit 502 and a second spout 506 coupled to the first spout 504 via a conduit or flexible tubing 508. The first spout 504 is illustratively shown as a showerhead and the second spout 506 is illustratively shown as a handshower. In alternative embodiments, the first spout 504 and/or the second spout 506 may take different forms. For example, both the first spout 504 and the second spout 506 may be showerheads. As another example, both the first spout 504 and the second spout 506 may be handshowers. In either case, the water supply conduit 502 delivers water to the first spout 504 and the second spout 506, via the conduit 508, and the shower system 500 illustratively discharges water at a first sprayface 510 of the first spout 504 and a second sprayface 512 of the second spout 506. More specifically, the first spout 504 includes a first plurality of spout outlets 514, and the first spout 504 selectively discharges water from one or more first spout outlets 516, one or more second spout outlets 518, and one or more third spout outlets 520. Similarly, the second spout 506 includes a second plurality of spout outlets 522, and the second spout 506 selectively discharges water from one or more first spout outlets 524, one or more second spout outlets 526, and one or more third spout outlets 528. In alternative embodiments, the first plurality of spout outlets 514 and/or the second plurality of spout outlets 522 may include a different number of sets of spout outlets. In either case, both the first spout 504 and the second spout 506 are selectively operable in different water discharge modes (that is, the spouts 504 and 506 selectively discharge water from different sets of spout outlets) or combinations of different water discharge modes. A user interface 530 for changing water discharge modes of both the first spout 504 and the second spout 506 may be conveniently carried by one of the first spout 504 and the second spout 506. Illustratively, the user interface 530 is carried by the second spout 506.

Figure 9:
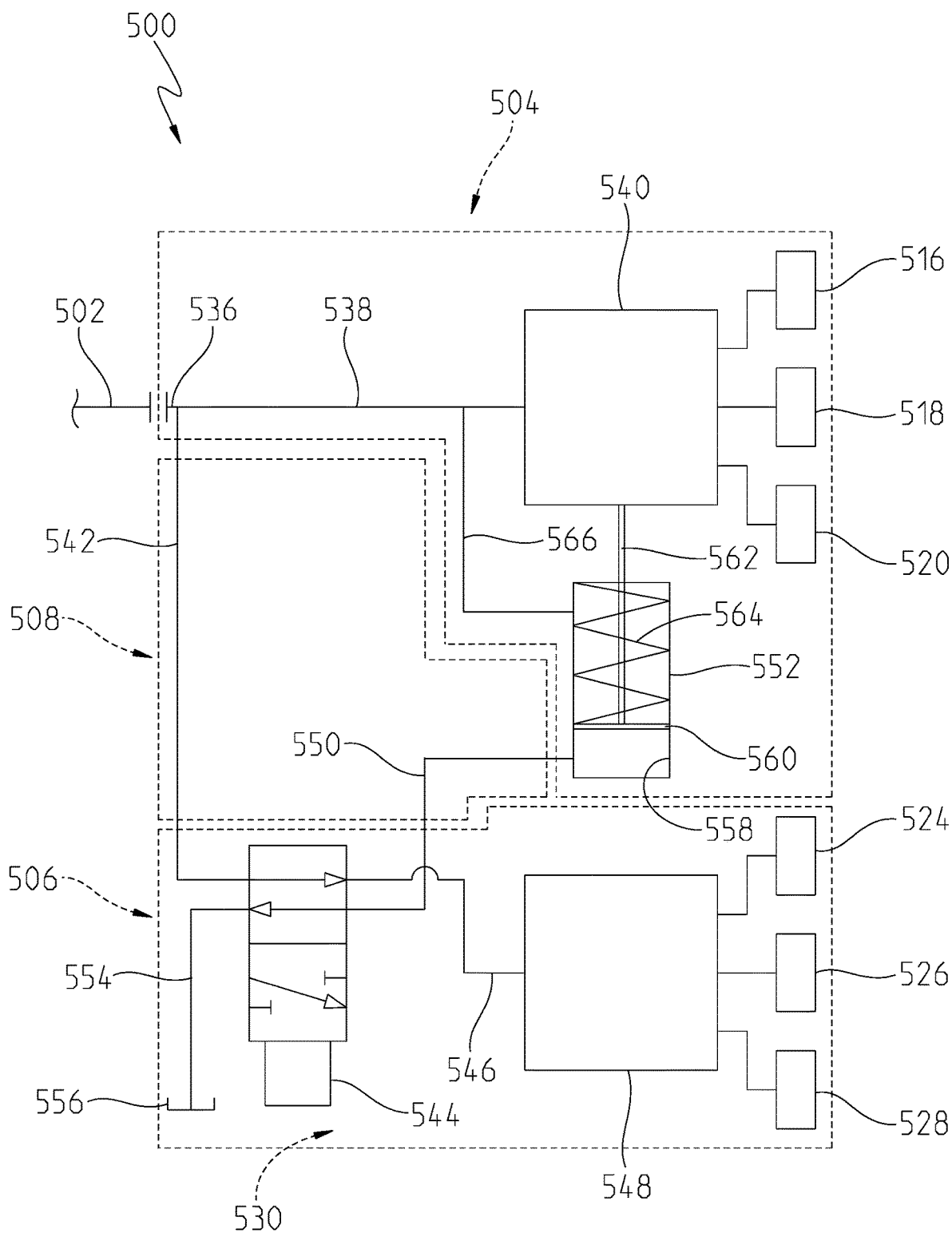
FIG. 9 is a schematic illustration of the shower system of FIG. 8 and the water supply conduit.

Referring to FIG. 9, the shower system 500 and the water supply conduit 502 are schematically illustrated. The first spout 504 of the shower system 500 illustratively includes an inlet 536 in fluid communication with the water supply conduit 502. The inlet 536 is in fluid communication with an inlet passageway 538 of the first spout 504. The inlet passageway 538 is in fluid communication with a first diverter 540 of the first spout 504. The first diverter 540 is in fluid communication with and selectively delivers water to one or more of the sets of spout outlets 516, 518, and 520 for discharge from the first spout 504. The first diverter 540 may be any mechanism that is actuatable to change the water discharge mode of the first spout 504, such as, for example, a linearly-actuated device, including a "button click" diverter (more specifically, any of the diverters described in U.S. Pat. App. Pub. 2018/0195257, the disclosure of which is incorporated by reference) or a "pen click" diverter (having, for example, a cam and pawl mechanism), a rotatably-actuated device (having, for example, a rack and pinion mechanism), or the like.

With continued reference to FIG. 9, the shower system 500 further includes components that facilitate fluid communication between the first spout 504 and the second spout 506. More specifically, the conduit 508 includes a first actuator passageway 542 in fluid communication with the inlet passageway 538 of the first spout 504. The first actuator passageway 542 is also in fluid communication with a valve 544 of the second spout 506. The valve 544 forms, in part, the user interface 530 of the second spout 506 and facilitates changing water discharge modes of the shower system 500. Specific exemplary forms of the valve 544 include any of those described above. Generally, however, the valve 544 is a two-position, four-port valve. A first position of the valve 544, as illustrated, may be the normal position of the valve 544, or the valve 544 may be biased toward the first position. In the first position, the valve 544 permits fluid communication between the first actuator passageway 542 and a diverter passageway 546. The diverter passageway 546 is in fluid communication with a second diverter 548 of the second spout 506. The second diverter 548 forms, in part, the user interface 530 of the second spout 506 and facilitates changing water discharge modes of the shower system 500. More specifically, the second diverter 548 is in fluid communication with and selectively delivers water to one or more of the sets of spout outlets 524, 526, and 528 for discharge from the second spout 506. The second diverter 548 may be any mechanism that is actuatable to change the water discharge mode of the second spout 506, including any of the mechanisms described above with reference to the first diverter 540. In the first position, the valve 544 also permits fluid communication between a second actuator passageway 550 of the conduit 508, which is in fluid communication with a diverter actuator 552 of the first spout 504, and a discharge passageway 554 of the second spout 506, which is in fluid communication with a discharge port 556 of the second spout 506. The discharge port 556 thereby discharges water received from the diverter actuator 552. The discharge port 556 may be disposed inside the second spout 506 to facilitate inconspicuously discharging water received from the diverter actuator 552. In a second position, the valve 544 permits fluid communication between the first actuator passageway 542 and the second actuator passageway 550. The second actuator passageway 550 delivers water to the diverter actuator 552, which causes the diverter actuator 552 to transition from an unactuated position to an actuated position, and the diverter actuator 552 thereby actuates the first diverter 540 to change the water discharge mode of the first spout 504. In the second position, the valve 544 also inhibits fluid communication between the first actuator passageway 542 and the diverter passageway 546. As a result, in the second position the second diverter 548 does not receive water and the second spout 506 does not discharge water.

In some embodiments, the first spout 504 and the second spout 506 may be configured such that they do not simultaneously discharge water. More specifically, the first diverter 540 may be operable to inhibit water delivery via the first spout 504 and the second diverter 548 may be operable to inhibit water delivery via the second spout 506.

Still referring to FIG. 9, the diverter actuator 552 is illustratively shown as a hydraulically-driven linear actuator. More specifically, the diverter actuator 552 includes a chamber 558 for receiving water from the valve 544. The chamber 558 carries a piston 560, and the piston 560 translates within the chamber 558 when the chamber 558 receives water from the valve 544. Opposite the second actuator passageway 550, the piston 560 couples a rod 562. The rod 562 translates with the piston 560 when the chamber 558 receives water from the valve 544, and the rod 562 thereby presses and actuates the first diverter 540 to change the water discharge mode of the first spout 504.

The components of the diverter actuator 552 may have any of various dimensions provided that the diverter actuator 552 is capable of providing a force sufficient to actuate the first diverter 540, in view of typical pressure of the water received by the diverter actuator 552. For example, the piston 560 may have a diameter of about 0.5 inches and the diverter actuator 552 may receive water at a pressure of about 30 psi. In this case, if resistance forces are negligible, the diverter actuator 552 provides an actuator force of about 6 lbs. Such a force is sufficient to actuate various types of pen click and button click diverters.

With further reference to FIG. 9, the unactuated position may be the normal position of the diverter actuator 552, or the diverter actuator 552 may be biased toward the unactuated position. More specifically, the diverter actuator 552 may further include a spring 564, such as a compression spring, that urges the piston 560 and the rod 562 away from first diverter 540. Additionally or alternatively, the first spout 504 may further include a return passageway 566 in fluid communication with the inlet passageway 538 and the chamber 558 opposite the second actuator passageway 550. As such, water delivered by the return passageway 566 to the chamber 558 urges the piston 560 and the rod 562 away from the first diverter 540. Additionally or alternatively, the first diverter 540 may resist actuation and thereby urge the diverter actuator 552 toward the unactuated position.

Figure 10:
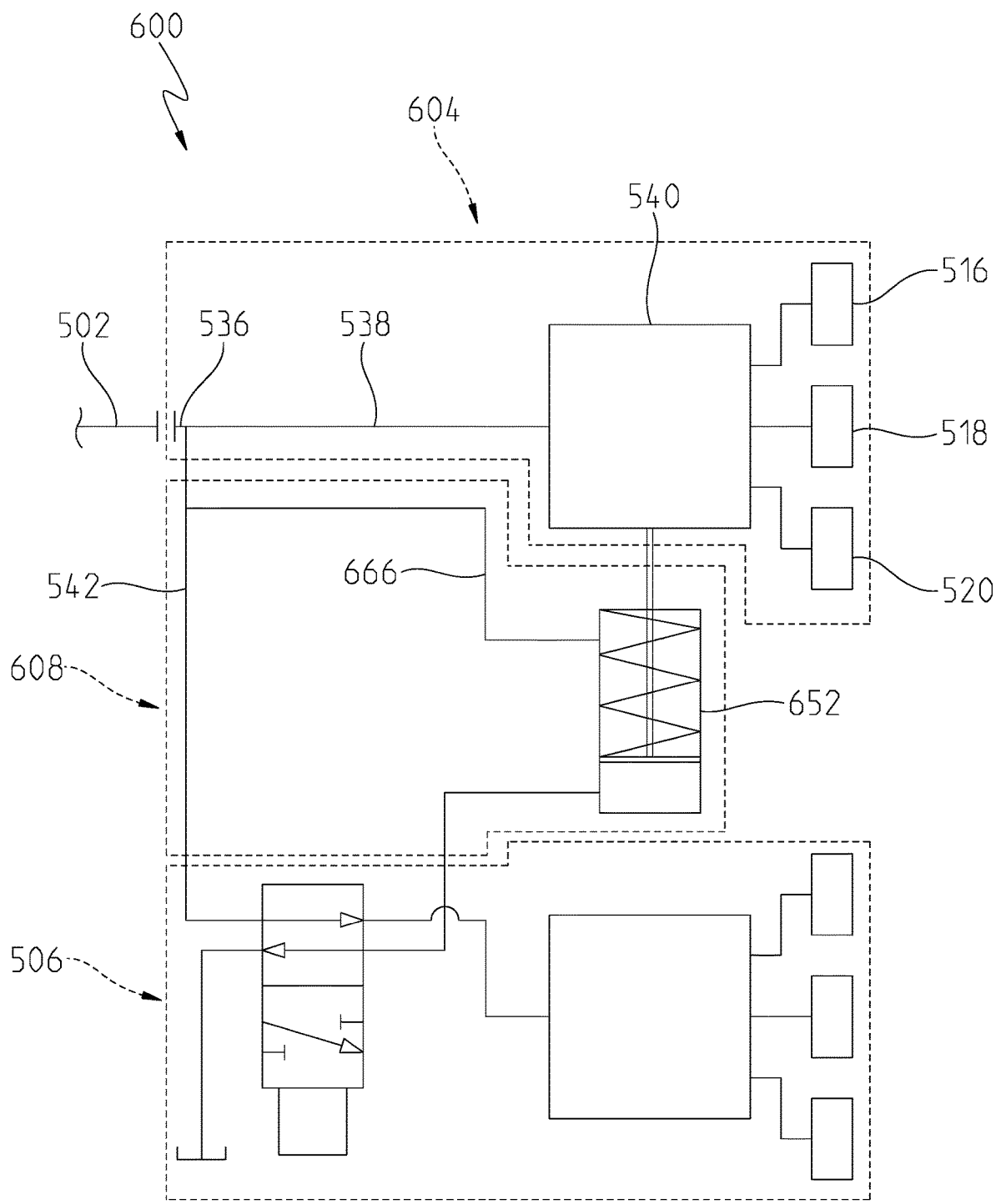
FIG. 10 is a schematic illustration of another illustrative multiple function shower system of the present disclosure coupled to a water supply conduit.

Referring to FIG. 10, another illustrative multiple function shower system 600 of the present disclosure is shown coupled to the water supply conduit 502. The shower system 600 includes a second spout 506 which is as described above. The shower system 600 also includes a first spout 604 and a conduit 608, which are similar to the first spout 504 and the conduit 508, respectively, described above. More specifically, the first spout 604 includes an inlet 536, an inlet passageway 538, a first diverter 540, and spout outlets 516, 518, and 520, each of which are as described above, and the conduit 608 includes a first actuator passageway 542 as described above. In contrast to the shower system 500, however, the diverter actuator 652 and the return passageway 666 are provided as parts of the conduit 608 instead of the first spout 604. The diverter actuator 652 and the return passageway 666 are otherwise the same as the diverter actuator 552 and the return passageway 566, respectively, described above.

Figure 11:
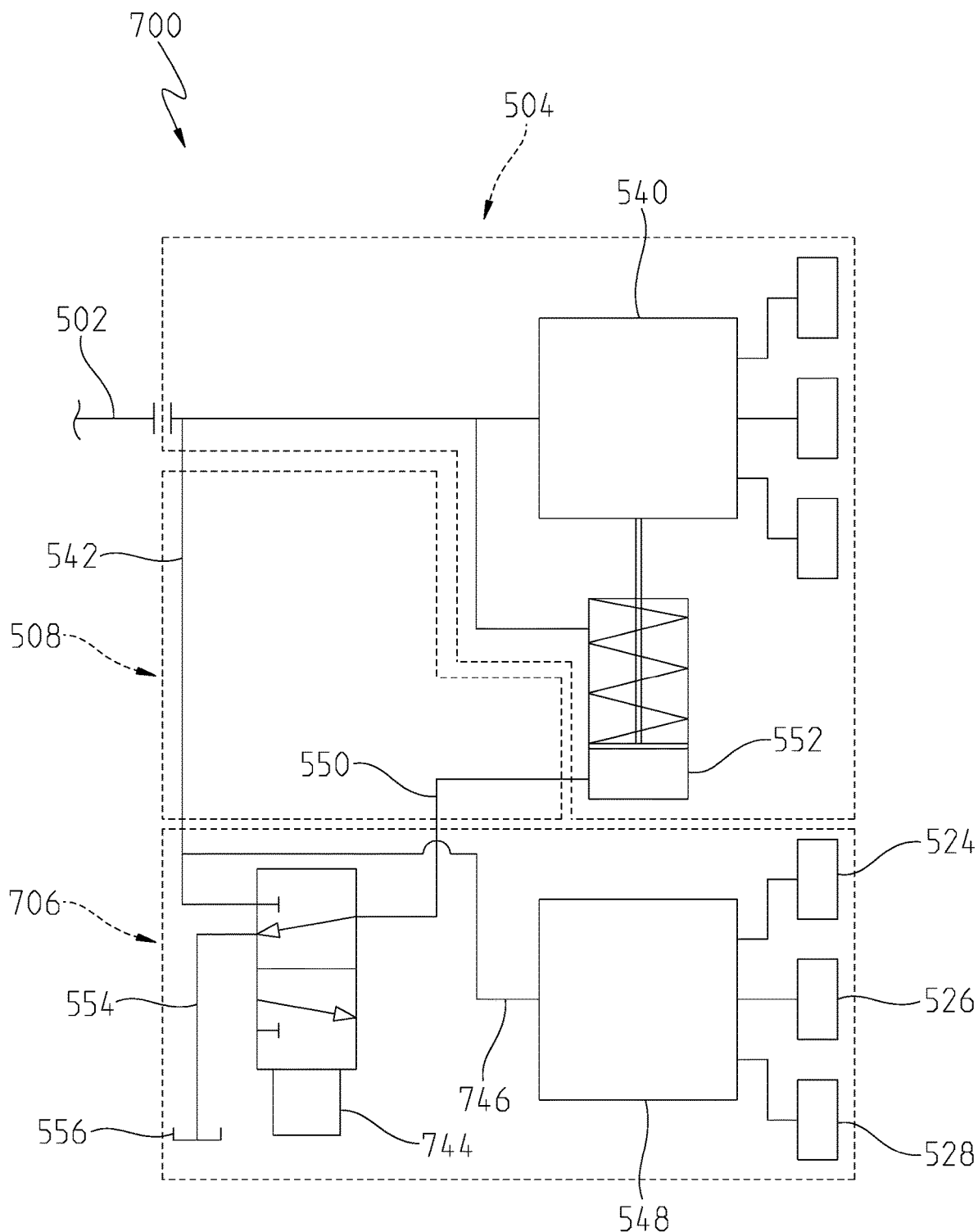
FIG. 11 is a schematic illustration of yet another illustrative multiple function shower system of the present disclosure coupled to a water supply conduit.

Referring to FIG. 11, another illustrative multiple function shower system 700 of the present disclosure is shown coupled to the water supply conduit 502. The shower system 700 includes a first spout 504 and a conduit 508 which are as described above. The shower system 700 also includes a second spout 706, which is similar to the second spout 506 described above. More specifically, the second spout 706 includes a second diverter 548, spout outlets 524, 526, and 528, a discharge passageway 554, and a discharge port 556, each of which are as described above. In contrast to the shower system 500, however, the system 700 includes a diverter passageway 746 in constant fluid communication with both the first actuator passageway 542 and the second diverter 548. Further, the second spout 706 includes a valve 744 in fluid communication with the first actuator passageway 542. Generally, the valve 744 is a two-position, three-port valve. A first position of the valve 744, as illustrated, may be the normal position of the valve 744, or the valve 744 may be biased toward the first position. In the first position, the valve 744 inhibits fluid communication between the first actuator passageway 542, the second actuator passageway 550 and, as a result, the diverter actuator 552. Instead, in the first position the valve 744 permits fluid communication between the second actuator passageway 550, the discharge passageway 554 and, as a result, the discharge port 556. In a second position, the valve 744 permits fluid communication between the first actuator passageway 542 and the second actuator passageway 550. The second actuator passageway 550 delivers water to the diverter actuator 552, which causes the diverter actuator 552 to transition from an unactuated position to an actuated position, and the diverter actuator 552 thereby actuates the first diverter 540 to change the water discharge mode of the first spout 504.

Figure 12:
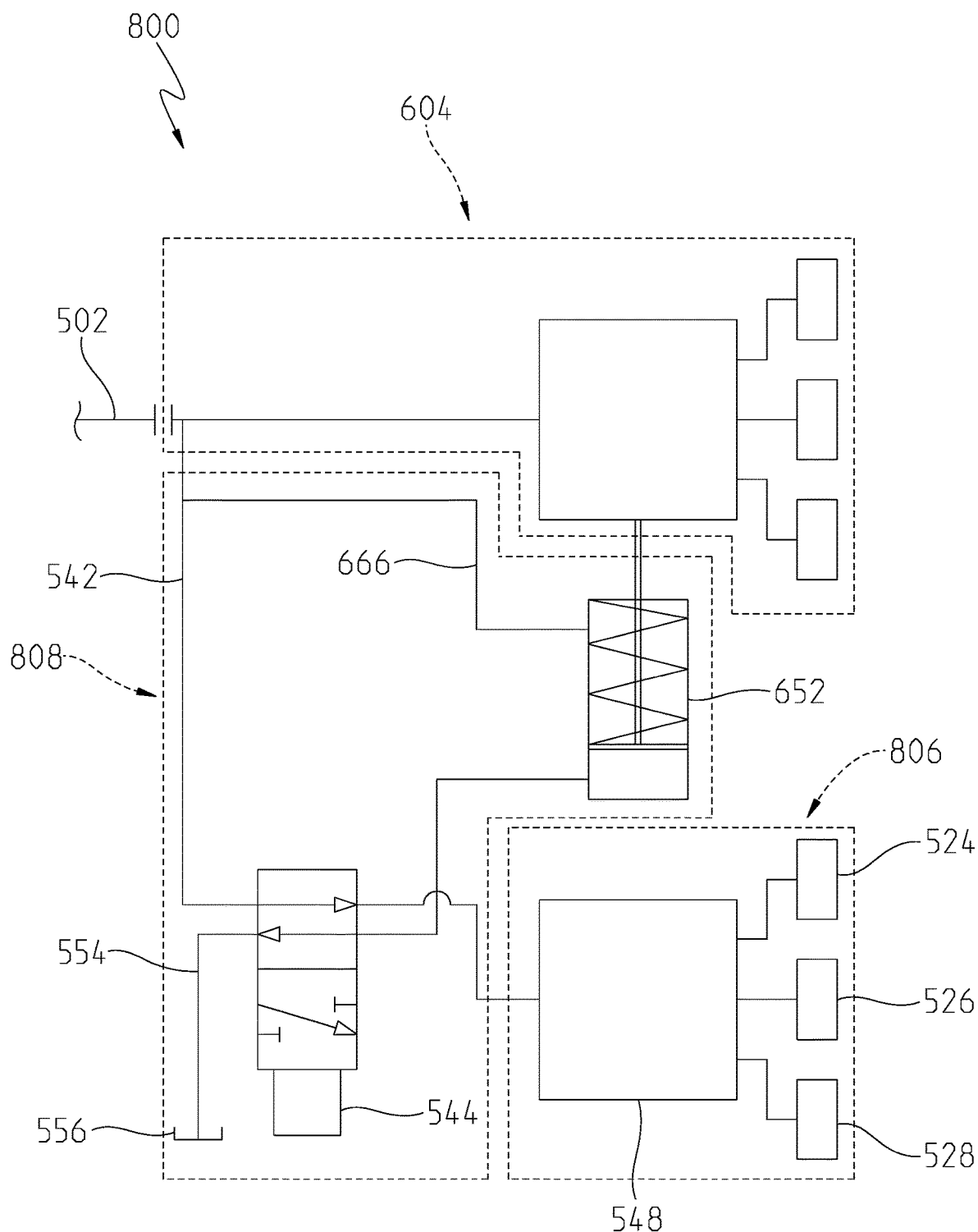
FIG. 12 is a schematic illustration of yet another illustrative multiple function shower system of the present disclosure coupled to a water supply conduit.

Referring to FIG. 12, another illustrative multiple function shower system 800 of the present disclosure is shown coupled to the water supply conduit 502. The shower system 800 includes a first spout 604 which is as described above. The shower system 800 also includes a conduit 808 and second spout 806, which are similar to the conduit 608 and the second spout 506, respectively, described above. More specifically, the conduit 608 includes a first actuator passageway 542, a return passageway 666, and a diverter actuator 652 as described above, and the second spout 806 includes first spout outlets 524, second spout outlets 526, third spout outlets 528, and a second diverter 548. In contrast to the shower system 600, however, the valve 544, the discharge passageway 554, and the discharge port 556 are provided as parts of the conduit 608 instead of the second spout 806.

The valves 544 and 744 may take various forms, such as any of those described above and including, for example, those described in connection with FIGS. 4-7.

Figure 13:
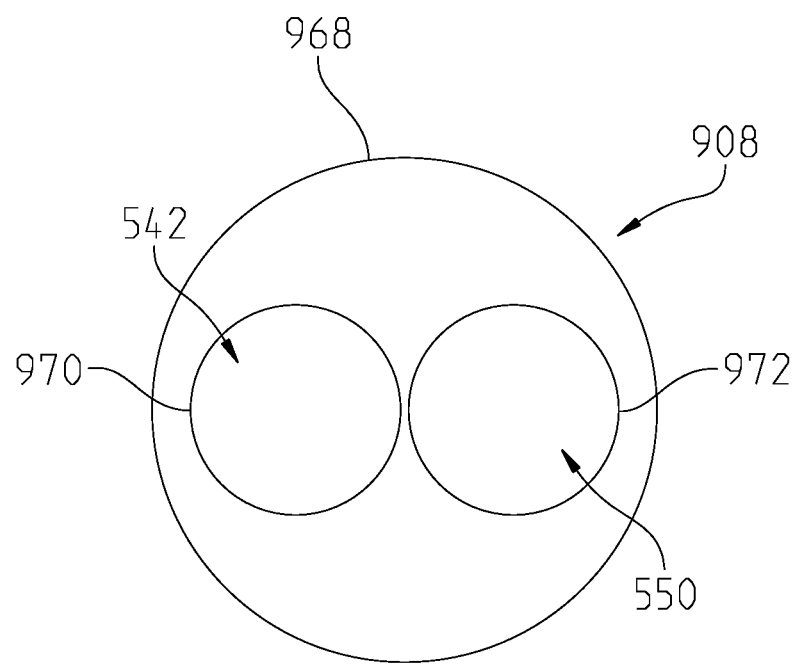
FIG. 13 is a cross-sectional view of an illustrative conduit of the present disclosure.
Figure 14:
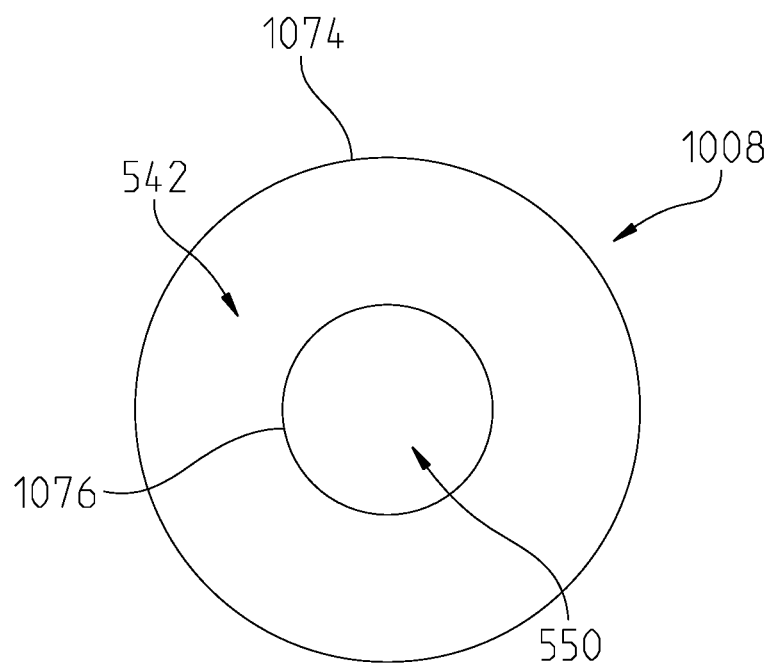
FIG. 14 is a cross-sectional view of another illustrative conduit of the present disclosure.

The conduits 508 and 708, and specifically portions of the conduits 508 and 708 including the both first actuator passageway 542 and the second actuator passageway 550, may take various forms. FIG. 13 illustrates an example of a cross-section of a conduit 908, which may be a portion of the conduits 508, 708, and 808. The conduit 908 includes an outer jacket 968 that carries a first inner conduit 970 and a second inner conduit 972 in a side-by-side arrangement. The first inner conduit 970 defines the first actuator passageway 542 and the second inner conduit 972 defines the second actuator passageway 550. FIG. 14 illustrates another example of a cross-section of a conduit 1008, which may be a portion of the conduits 508, 708, and 808. The conduit 1008 includes an outer conduit 1074 that carries an inner conduit 1076. Illustratively, the first actuator passageway 542 is defined between the outer conduit 1074 and the inner conduit 1076, and the second actuator passageway 550 is defined within the inner conduit 1076. In alternative embodiments, the second actuator passageway 550 is defined between the outer conduit 1074 and the inner conduit 1076, and the first actuator passageway 542 is defined within the inner conduit 1076. Illustratively, the inner conduit 1076 is concentrically disposed within the outer conduit 1074. In alternative embodiments, the inner conduit 1076 is non-concentrically disposed within the outer conduit 1074.

Although the invention has been described in detail with reference to certain preferred embodiments, variations and modifications exist within the spirit and scope of the invention as described and defined in the following claims.

The invention claimed is:

1. A shower system, comprising:
an inlet configured to receive water from a supply conduit;
a plurality of spout outlets configured to discharge water from the shower system;
a diverter configured to receive water from the inlet and deliver water to the plurality of spout outlets, the diverter being actuatable to change a water discharge mode of the plurality of spout outlets;
a valve configured to receive water from the inlet, the valve being actuatable to a first position and a second position; and
a diverter actuator configured to receive water from the valve in the second position, the diverter actuator being actuatable from an unactuated position to an actuated position upon receiving water from the valve, and the diverter actuator thereby actuating the diverter to change the water discharge mode of the plurality of spout outlets.

2. The shower system of claim 1, wherein the diverter actuator comprises:
a chamber configured to receive water from the valve in the second position; and
a piston carried in the chamber, the piston being movable in the chamber when the chamber receives water from the valve and the diverter actuator transitions from the unactuated position to the actuated position and thereby actuating the diverter to change the water discharge mode of the plurality of spout outlets.

3. The shower system of claim 1, further comprising a discharge port configured to receive water from the diverter actuator and discharge water from the shower system when the diverter actuator returns from the actuated position to the unactuated position.

4. The shower system of claim 1, wherein the valve is a mechanically-operated valve.

5. The shower system of claim 1, wherein the valve is a pilot-operated diaphragm valve.

6. The shower system of claim 5, wherein the pilot-operated diaphragm valve is a pilot-operated diaphragm solenoid valve.

7. The shower system of claim 1, wherein the valve is an electrically-operated valve.

8. The shower system of claim 1, wherein the valve comprises an armature and a magnet, the magnet attracting the armature to actuate the valve from the first position to the second position.

9. A shower system, comprising:
an inlet configured to receive water from a supply conduit;
a diverter configured to receive water from the inlet, the diverter being actuatable to a first mode and a second mode;
a plurality of spout outlets configured to receive water from the diverter, the plurality of spout outlets configured to discharge water in a first water discharge mode in the first mode and discharge water in a second water discharge mode in the second mode;
a valve configured to receive water from the inlet, the valve being actuatable to a first position and a second position; and
a diverter actuator configured to receive water from the valve in the second position, whereupon receiving water from the valve the diverter actuator actuating the diverter from the first mode to the second mode.

10. The shower system of claim 9, wherein the diverter actuator comprises:
a chamber configured to receive water from the valve in the second position; and
a piston carried in the chamber, the piston being movable in the chamber when the chamber receives water from the valve and thereby actuating the diverter from the first mode to the second mode.

11. The shower system of claim 10, wherein the diverter actuator is actuatable from an unactuated position to an actuated position, the diverter actuator thereby actuating the diverter from the first mode to the second mode, and wherein the diverter actuator further comprises a spring configured to return the diverter actuator from the actuated position to the unactuated position upon the valve transitioning from the second position to the first position.

12. The shower system of claim 9, wherein the diverter actuator is actuatable from an unactuated position to an actuated position, the diverter actuator thereby actuating the diverter from the first mode to the second mode, and further comprising a return passageway configured to receive water from the inlet and deliver water to the diverter actuator to return the diverter actuator from the actuated position to the unactuated position upon the valve transitioning from the second position to the first position.

13. The shower system of claim 9, wherein the diverter actuator is actuatable from an unactuated position to an actuated position, the diverter actuator thereby actuating the diverter from the first mode to the second mode, and further comprising a discharge port configured to receive water from the diverter actuator and discharge water from the shower system when the diverter actuator returns from the actuated position to the unactuated position.

14. The shower system of claim 9, wherein the valve is a mechanically-operated valve.

15. The shower system of claim 9, wherein the valve is a pilot-operated diaphragm valve.

16. The shower system of claim 9, wherein the valve is an electrically-operated valve.

17. The shower system of claim 16, further comprising a power source operably coupled to the valve.

18. The shower system of claim 17, wherein the power source comprises a hydrogenerator.

19. The shower system of claim 18, wherein the hydrogenerator is configured to receive water from the inlet and convert mechanical energy of the water to electrical energy.

20. The shower system of claim 9, wherein the valve comprises an armature and a magnet, the magnet attracting the armature to actuate the valve from the first position to the second position.

* * * * *